(12) United States Patent
Small et al.

(10) Patent No.: US 6,580,426 B1
(45) Date of Patent: Jun. 17, 2003

(54) COMPUTER GRAPHICS APPARATUS FOR PROCESSING OF DATA DEFINING A THREE-DIMENSIONAL COMPUTER MODEL TO PARTITION THE THREE-DIMENSIONAL SPACE INTO A PLURALITY OF SECTORS

(75) Inventors: Jonathan Andrew Stanley Small, Guildford (GB); Adam Michael Billyard, Guildford (GB); Damian Justin Scallan, Guildford (GB); Robert Keith John Withey, Guildford (GB)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/512,354

(22) Filed: Feb. 24, 2000

(30) Foreign Application Priority Data

Mar. 3, 1999 (GB) .............................. 9904901

(51) Int. Cl.⁷ .............................. G06T 15/40
(52) U.S. Cl. ................. 345/421; 345/418; 345/419; 345/420
(58) Field of Search ............... 345/419, 420, 345/421, 694

(56) References Cited

U.S. PATENT DOCUMENTS

| | | | | |
|---|---|---|---|---|
| 5,355,325 A | * | 10/1994 | Uhlmann | 342/189 |
| 5,402,532 A | * | 3/1995 | Epstein et al. | 345/422 |
| 5,579,454 A | | 11/1996 | Billyard et al. | 395/121 |
| 5,748,197 A | * | 5/1998 | Guibas et al. | 345/672 |
| 5,757,321 A | | 5/1998 | Billyard | 345/434 |
| 6,054,991 A | * | 4/2000 | Crane et al. | 345/420 |
| 6,215,503 B1 | * | 4/2001 | Snyder et al. | 345/629 |
| 6,310,620 B1 | * | 10/2001 | Lauer et al. | 345/424 |
| 6,373,485 B2 | * | 4/2002 | Sowizral et al. | 345/421 |
| 6,429,864 B1 | * | 8/2002 | Schwarzer | 345/419 |
| 6,437,796 B2 | * | 8/2002 | Sowizral et al. | 345/622 |

FOREIGN PATENT DOCUMENTS

| | | |
|---|---|---|
| GB | 2229811 A | 10/1990 |
| GB | 2298111 A | 8/1996 |
| WO | WO 98/43208 | 10/1998 |

OTHER PUBLICATIONS

Hayder Radha, et al., "Image Compression Using Binary Space Partitioning Trees", Dec., 1996, IEEE Transactions on Image Processing, vol. 5, No. 1, pp. 1610–1624.

J. Foley et al., Computer Graphics Principles and Practices, 2$^{nd}$ Edition, Addison–Wesley Publishing Company, 1996, pp. 664–681.

* cited by examiner

Primary Examiner—Jeffery Brier
Assistant Examiner—Daniel J Chung
(74) Attorney, Agent, or Firm—Fitzpatrick, Cella, Harper & Scinto

(57) ABSTRACT

A computer graphics apparatus comprises a modelling package and a rendering package. The modelling package outputs data representative of the definition of a scene to be represented graphically. The rendering package receives data representative of the scene to be represented graphically, and converts that data into rasterised image data. Preprocessing apparatus is provided to arrange the data defining the scene in a manner which can be more easily processed by the rendering package. The preprocessing apparatus partitions the scene by means of partition planes in directions selected from three mutually perpendicular directions. The planes are positioned so as to eliminate as much empty space as possible, to cause as little division of geometry of the scene as possible, and to deliver sections of the scene which contain no more than a particular level of detail.

33 Claims, 12 Drawing Sheets

COMPUTER GRAPHICS APPARATUS FOR PROCESSING OF DATA DEFINING A THREE-DIMENSIONAL COMPUTER MODEL TO PARTITION THE THREE-DIMENSIONAL SPACE INTO A PLURALITY OF SECTORS

BACKGROUND OF THE INVENTION

1. Field of the Invention

This invention relates to apparatus for generating graphical images, and is particularly concerned with the process of converting information describing a scene to be represented into a rasterised image.

2. Description of Related Art

Spatial partitioning is a technique which allows a problem to be broken down into a number of smaller more soluble problems. In the field of computer graphics, objects to be represented in an environment are defined in terms of three-dimensional data, which then needs to be rendered into rasterised two-dimensional data to be displayed on a VDU. From a particular viewpoint, the projections of the objects may overlap significantly, which can lead to very difficult computations having to be made.

By breaking down the larger rendering problem into a number of smaller problems, the overall rendering process can be made easier. As described in "Computer Graphics Principles and Practices" by Foley, Van Dam, Feiner and Hughes, 2nd Edition, Addison-Wesley Publishing Company, ISBN 0-201-12110-7) pp 664–680, it is possible to partition a space by superimposing a three-dimensional grid over a space within which objects are defined, and then each grid box can be processed independently.

Adaptive partitioning, in which the size of partitions within the space varies, involves the sub-division of the space to be rendered according to a recursive process, until a termination criterion is reached. For example, sub-division may stop when there are fewer than a maximum number of objects in a partition.

The partitioning information can be carried in a data structure such as a binary space partition tree (BSP). However, a BSP tree can become unwieldy if partitioning is carried out incorrectly. A number of nodes of the BSP tree may become difficult to process or time consuming in that they represent nearly empty partitions of the space. Moreover, arbitrary partitioning of a space may lead to division of objects between two parts of a space. This can actually increase the computational expense of the rendering process.

It is object of at least an aspect of the invention to provide an improved means of partitioning a space preliminary to rendering procedures.

BRIEF SUMMARY OF THE INVENTION

According to a first aspect of the invention, apparatus for arranging data defining a scene to be represented graphically comprises means for partitioning the scene by means of a plane oriented in a selected one of a predetermined set of directions, the means for partitioning being operable to select the direction and position of the plane with reference to the content of the scene.

According to a second aspect of the invention, a method for arranging data defining a scene to be represented graphically comprises the steps of defining a predetermined set of partition directions, processing the content of the scene to identify a suitable partition plane in one of those predetermined directions, and partitioning the scene by means of the partition plane.

BRIEF DESCRIPTION OF THE DRAWINGS

A specific embodiment of the invention will now be described by way of example only with reference to the accompanying drawings, in which.

DETAILED DESCRIPTION OF THE INVENTION

Figure 1:
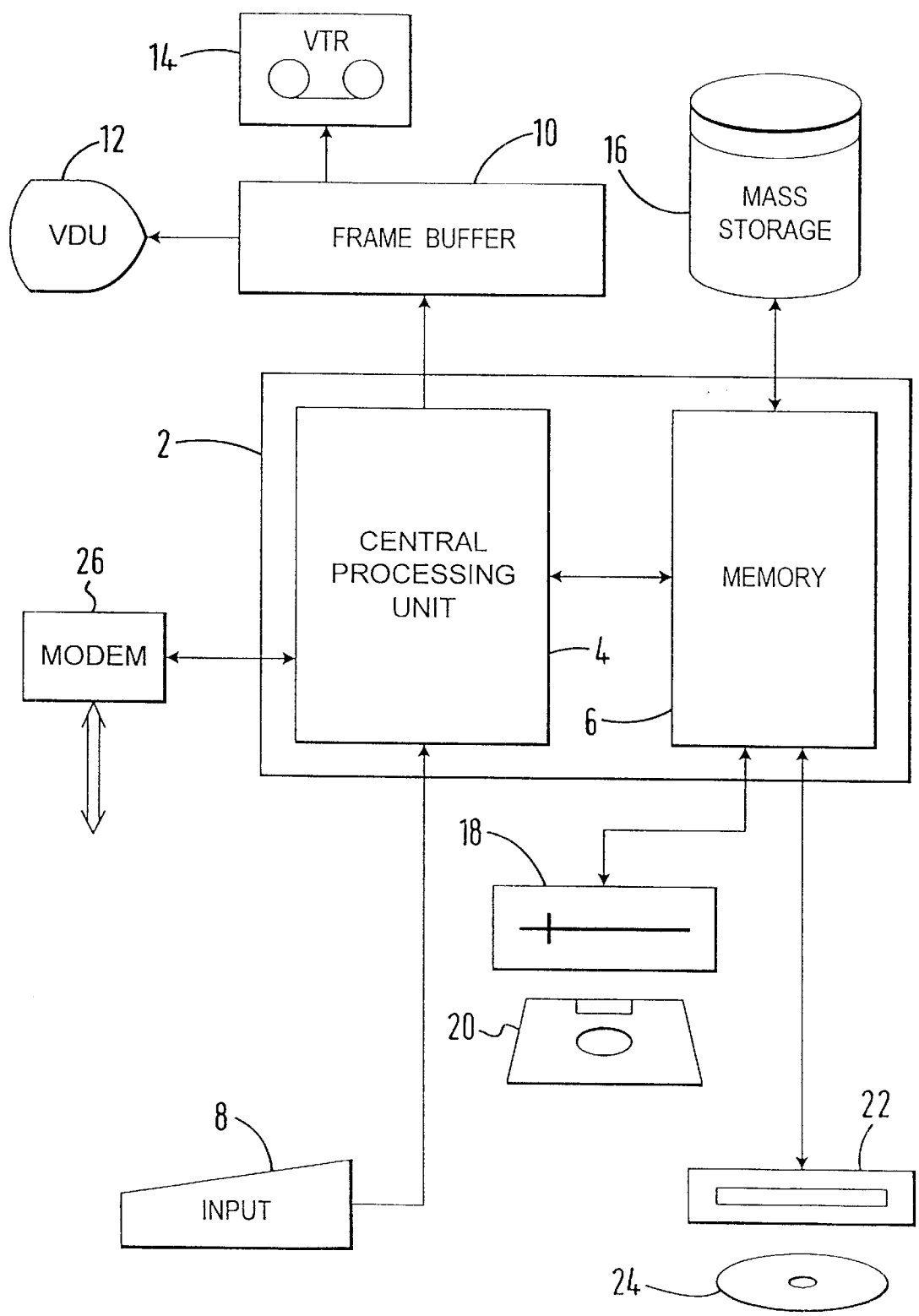
FIG. 1 is a schematic block diagram of computer apparatus in accordance with a specific embodiment of the invention.

FIG. 1 is a block diagram showing the general arrangement of a data processing apparatus according to an embodiment. In the apparatus, there is provided a computer 2, which comprises a central processing unit (CPU) 4 connected to a memory 6 operable to store a program defining the sequence of operations of the CPU 4, and to store object and image data used in calculations by the CPU 4.

Coupled to an input port of the CPU 4 there is an input device 8, which may comprise, for example, a keyboard and/or a position sensitive input device such as a mouse, tracker-ball, or a digitizer tablet and stylus etc.

Also coupled to the CPU 4 is a frame buffer 10 which comprises a memory unit arranged to store image data relating to at least one image, for example by providing one (or several) memory location(s) per pixel of the image. The value stored in the frame buffer for each pixel defines the colour or intensity of that pixel in the image.

Images are generally two-dimensional arrays of pixels, and are conveniently described in terms of Cartesian coordinates, so that the position of a given pixel can be described by a pair of x-y coordinates. This representation is convenient when, for example, the image is to be displayed on a raster scan display since the x coordinate maps to the distance along a line of the display, and the y coordinate maps to the number of the line. The frame buffer 10 has sufficient memory capacity to store at least one image. For example, for an image having a resolution of 1000 by 1000 pixels, the frame buffer 10 includes $10^6$ pixel locations, each addressable directly or indirectly in terms of pixel coordinates x,y.

Coupled to the frame buffer 10 is a display unit 12 for displaying the image stored in the frame buffer 10 in a conventional manner. Also coupled to the frame buffer 10 is a video tape recorder (VTR) 14 or other image recording device, such as a paper printer or 35 mm film recorder.

Coupled to the memory 6 (typically via the CPU 4), and possibly also to the frame buffer 10, is a mass storage device 16, such as a hard disc drive, having a high data storage capacity. Also coupled to the memory 6 is a disc drive 18 which is operable to accept removable data storage media, such as a floppy disc 20, and to transfer data stored thereon to the memory 6. A CD-ROM drive 22 is further coupled to the memory 6, operable to accept a CD-ROM 24, and to transfer data stored thereon to the memory 6.

A modem 26 is coupled to the CPU 4, in order to allow the CPU 4 to establish a data link with one or more other devices, such as via the Internet.

The CPU 4, memory 6, frame buffer 10, display unit 12 and mass storage device 16 may be commercially available as a complete system, for example as an IBM-compatible personal computer (PC) or a workstation such as the Sparc-Station available from Sun Microsystems.

A number of embodiments of the invention can be supplied commercially in the form of programs stored on a floppy disc 20, CD-ROM 24 or other medium, or signals transmitted over a data link for instance via the modem 26, so that the receiving hardware becomes re-configured into an apparatus embodying the invention. As will be seen, the invention allows technically better performance to be achieved than was hitherto possible with a given type of computer hardware.

Figure 2:
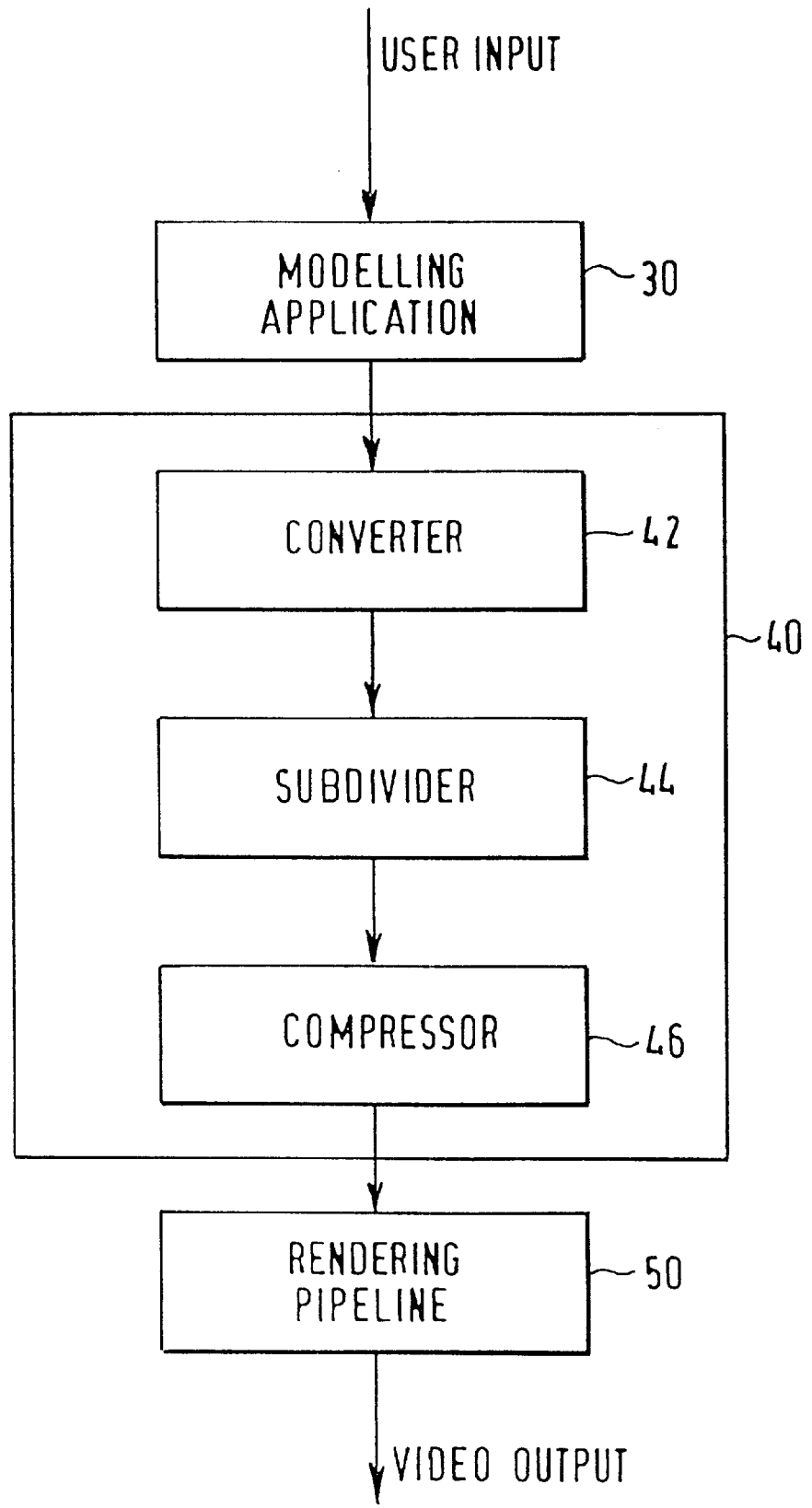
FIG. 2 is a schematic block diagram of a graphics modelling apparatus of the computer apparatus illustrated in FIG. 1.

FIG. 2 shows the configuration of the computer 2 illustrated in FIG. 1, to include a modelling application 30, a preprocessor 40 and a rendering pipeline 50.

The modelling application 30 is operative under the control of a user to generate a polygon mesh thereby defining solid objects for graphical representation.

The polygon mesh defined by the modelling application is then passed to the preprocessor 40. The preprocessor 40 converts the polygon mesh into a data structure which can be handled conveniently by the rendering pipeline 50. The rendering pipeline 50 processes the data structure in order to convert graphical primitives defined by the polygon mesh into rasterised data for display as a video output.

In further detail, the preprocessor 40 comprises a converter 42, a sub-divider 44 and a compressor 46. The converter 42 receives a polygon mesh from the modelling application 30, and converts that polygon mesh into a structure bounded by a bounding box. Thereafter, the bounded polygon mesh is passed to the sub-divider 44, which creates a binary space partition tree thereby breaking down the data defining the scene into manageable and indexable portions. The binary space partition tree is then passed to the compressor 46, which compresses the data further, so that it can be handled most conveniently by the rendering pipeline.

The rendering pipeline 50 is operable on the polygons contained in the binary space partition tree in order to provide rasterised image data relating thereto.

The modules described above are implemented in the computer 2, through the storage of computer implementable instructions in the memory 6 or accessible from the mass storage device 16.

Figure 17:
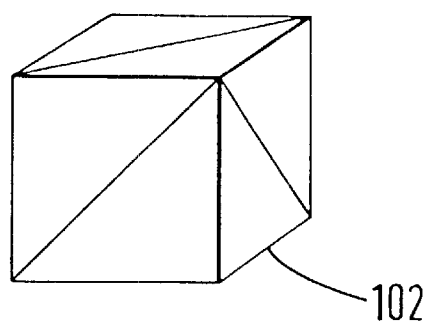
FIGS. 17 to 20 are perspective views of objects within the scene illustrated in FIG. 3.

In use, the modelling application 30 can be controlled by a user to define solid geometric objects as illustrated in FIGS. 17 to 20. FIG. 17 illustrates a cube 102, FIG. 18 a sphere 104, FIGS. 19a and 19b a cone 106 and FIG. 20 a cylinder 108.

Figure 18:
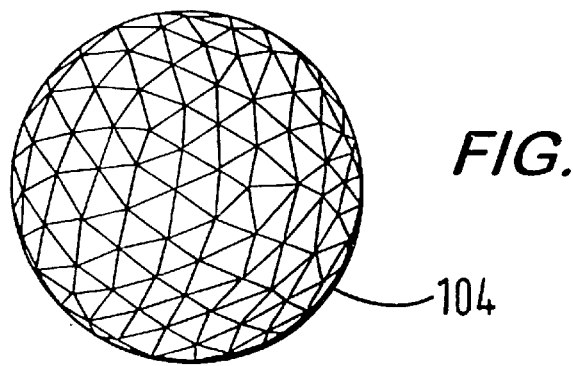

In conventional computer graphics applications, objects such as those illustrated in FIGS. 17 to 20 are described in terms of a collection of polygons. Those polygons are most commonly triangles, since a triangle can be described easily in terms of its three vertices. With a polygon of higher order, it is necessary to ensure that all vertices describing the polygon are coplanar, in order not to introduce errors and anomalies. The four objects illustrated in FIGS. 17 to 20 can be described in terms of a collection of triangles. The simplest object of all is the cube 102, which can be described in terms of 12 triangles, since two congruent isosceles right angle triangles, lying adjacent to each other along their hypotenuses and in a common plane, can be used to define a square. As illustrated in FIG. 18, a curved surface such as a sphere can only be approximated by triangles. However, by making the triangles sufficiently small, as illustrated in FIG. 18, the model can be made to resemble a sphere to the extent required by the application. FIGS. 19a and 19b illustrate the manner in which a cone can be described by means of triangles. FIG. 19a shows how the conical surface of a cone can be constructed from isosceles triangles descending from an apex point and FIG. 19b shows how isosceles triangles can radiate from a centre point to define a circular base.

It will be appreciated from the later description that the number of triangles represented for the sphere 104, cone 106 and cylinder 108 is lower than the actual case, for reasons of clarity.

Figure 19A:
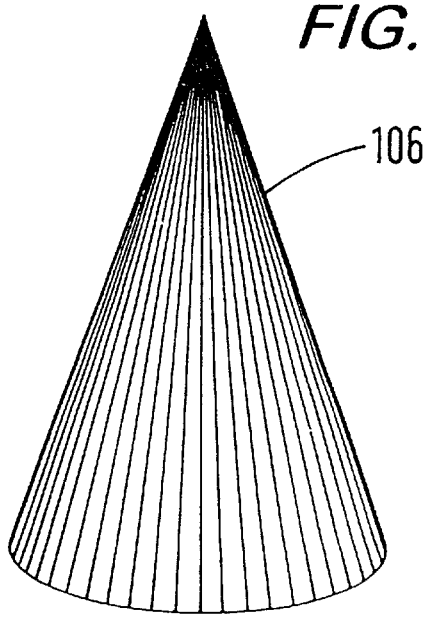
Figure 19B:
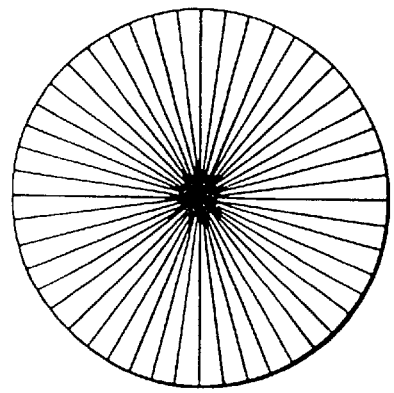
Figure 20:
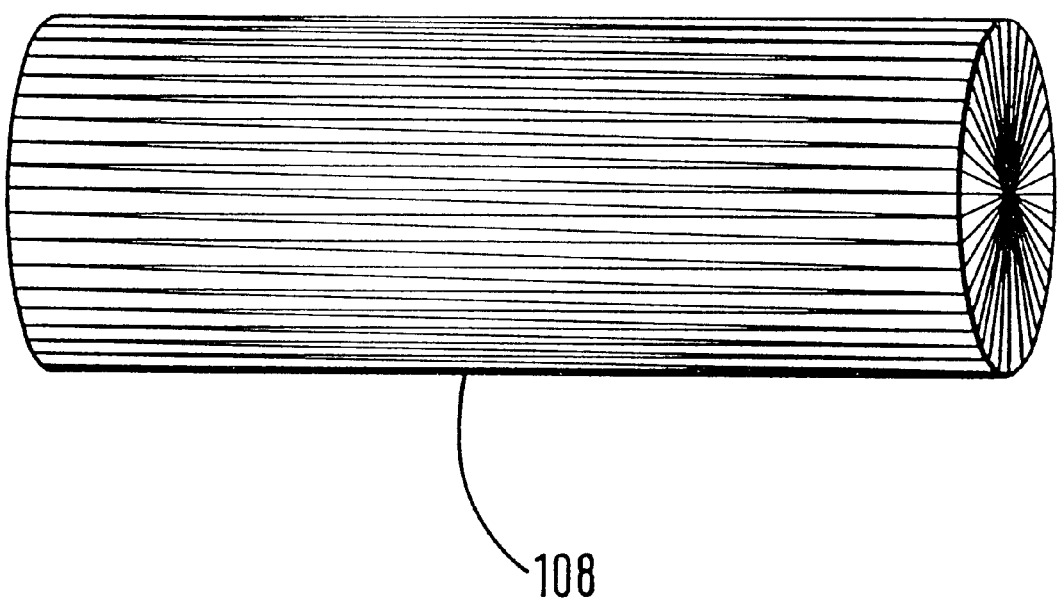

FIG. 20 shows how a cylinder can be constructed, by means of radiating isosceles triangles, as for FIG. 19b, to represent the circular ends, and in that adjacent isosceles triangles can be used to define rectangular finite elements which will construct the curved surface of the cylinder.

The entire scene can be described in terms of the vertices of the triangles making up the scene. The modelling application outputs data describing the relative positions of those vertices in the scene.

Figure 3:
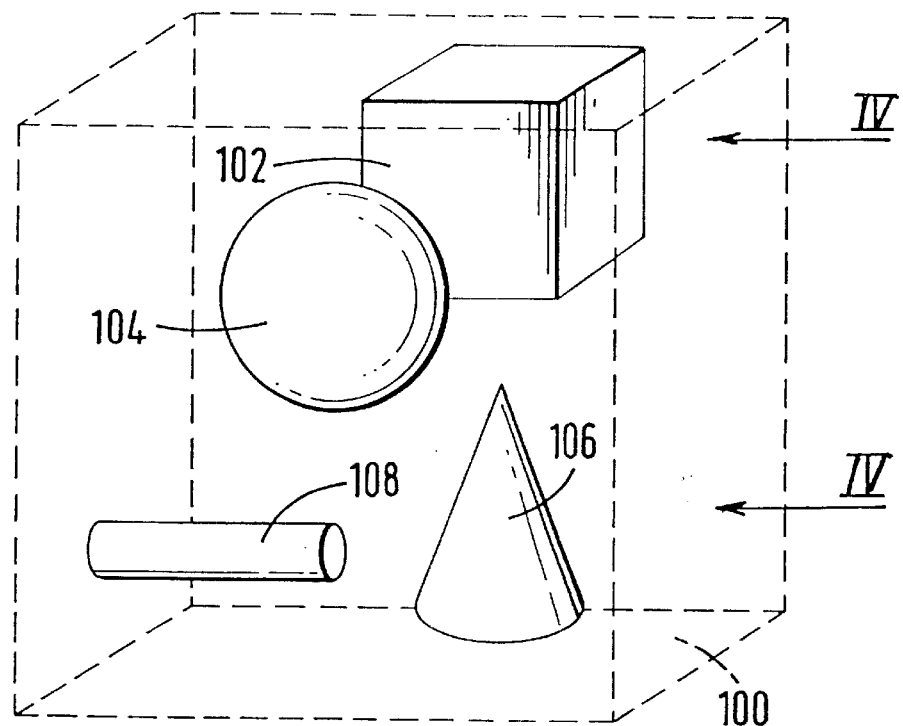
FIG. 3 is a perspective view of a three-dimensionally modelled scene to be displayed by the computer apparatus illustrated in FIG. 1.

The converter 42 receives the data describing the relative positions of the vertices of the triangles, and bounds the scene by a bounding box 100. The output of the converter 42 defines an arrangement as illustrated in FIG. 3. The bounded polygon mesh created by the converter 42 is then output the sub-divider 44.

Figure 4:
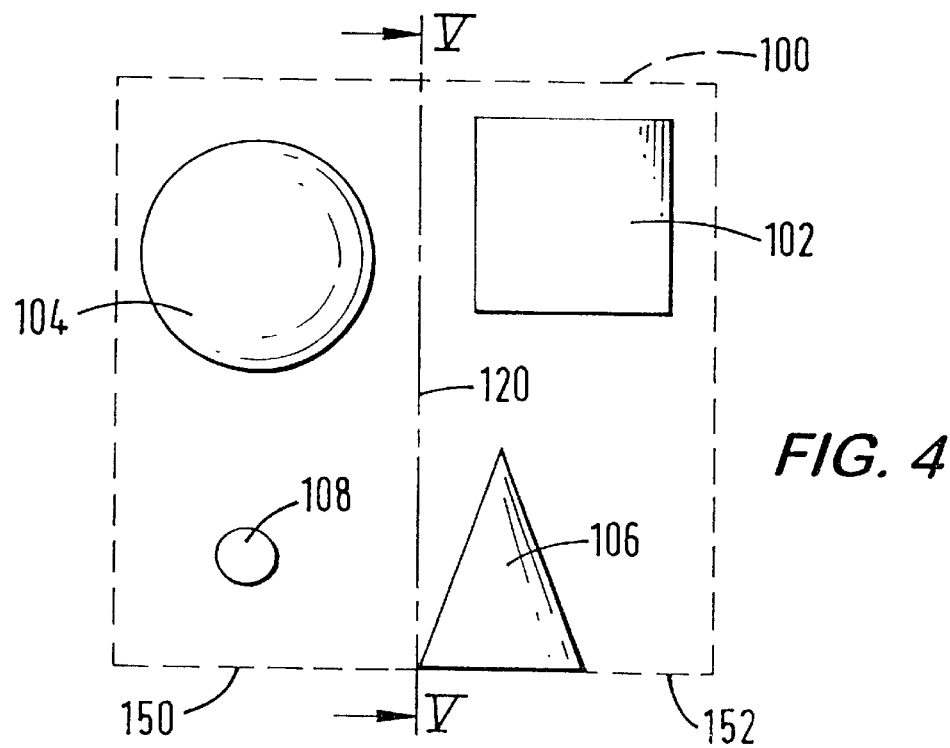
FIG. 4 is a side elevation in the direction of arrows IV—IV of the scene illustrated in FIG. 3.

Operation of the sub-divider 44 will now be described by way of example with reference to FIG. 3. Whereas FIG. 3 is a perspective view of the bounding box 100 containing the solid geometric objects 102, 104, 106, 108, FIG. 4 illustrates a side elevation of the bounding box 100 in the direction of arrows IV—IV. The relative positions of the various objects 102 to 108 can be identified by observation of FIGS. 3 and 4 in combination.

The sub-divider 44 operates in accordance with a procedure to construct a binary space partition tree, which will now be described with reference to FIG. 16 of the drawings.

Figure 16A:
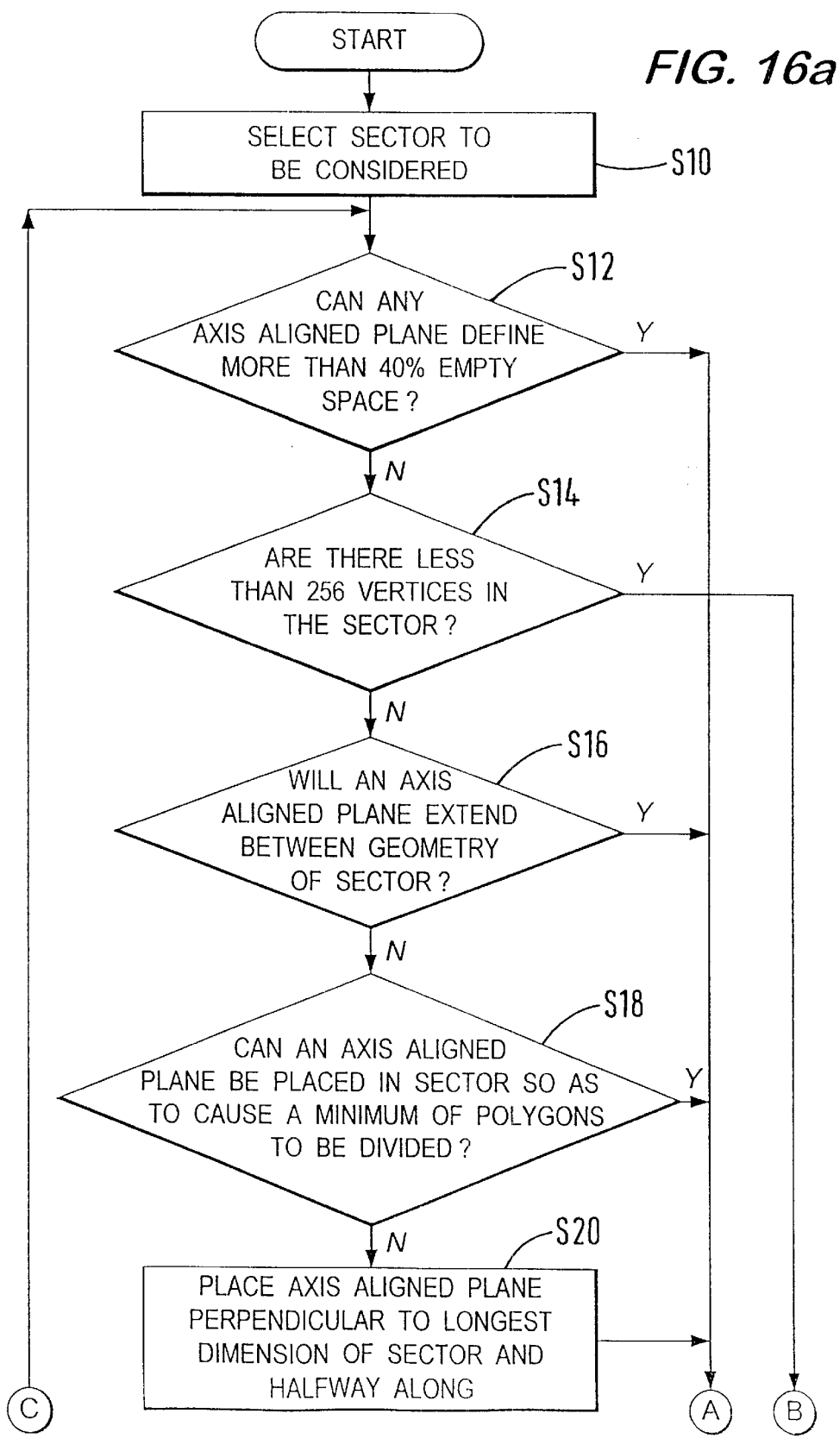
FIG. 16 is a flow diagram illustrating a procedure in accordance with a specific embodiment of the invention.
Figure 16B:
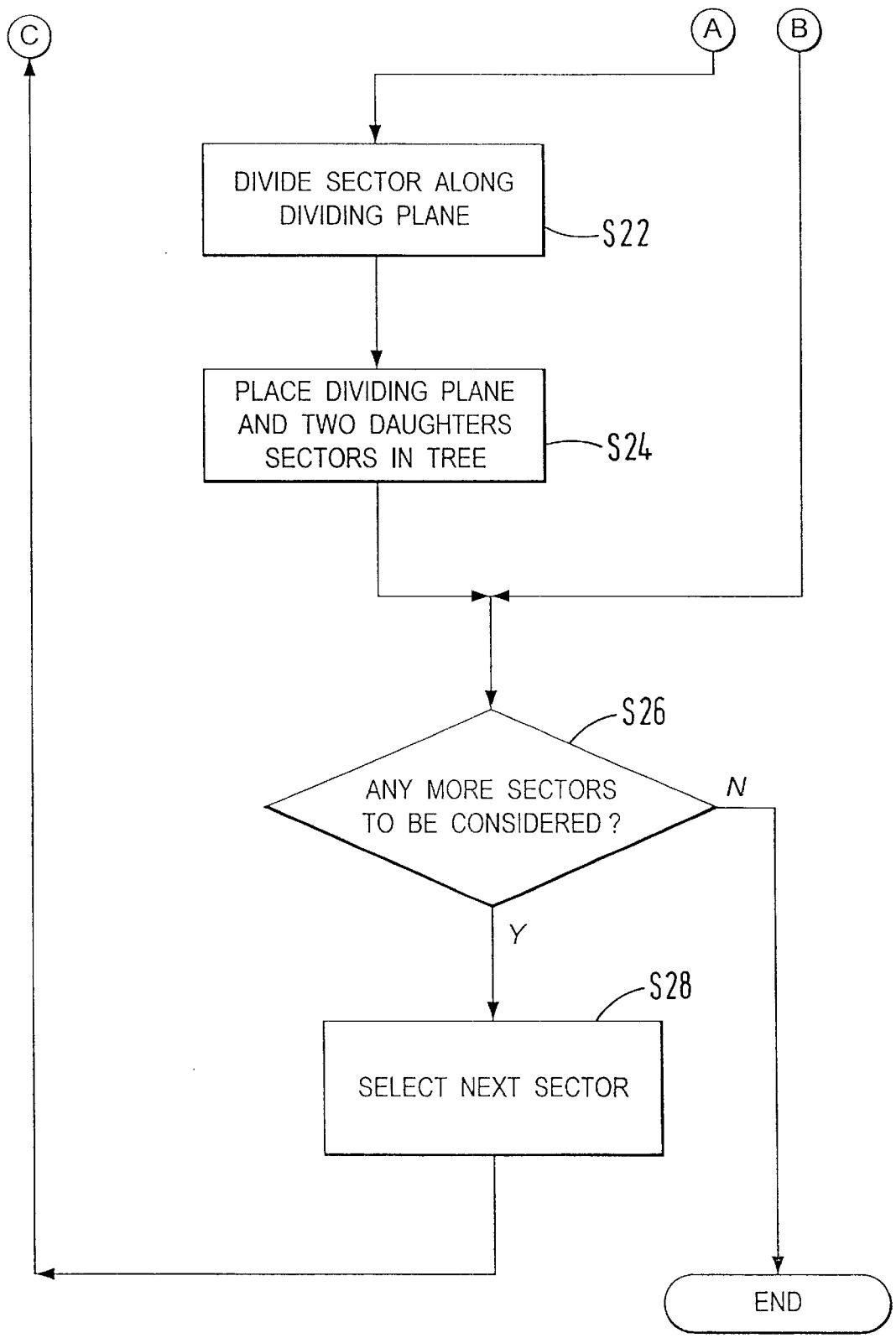

Firstly, in step S10 of FIGS. 16a and 16b a sector to be considered is selected. In this case, only one sector has been defined in the scene, i.e. the entire scene 100. Then step S12, an enquiry is made as to whether any axis aligned plane can be found which defines more than 40% empty space within the sector. It is important that the plane is axis aligned, since this will allow the plane to be identified merely by one coordinate. If an X coordinate is identified for the plane, the plane is aligned with the Y and Z axes, if a Y coordinate is identified, the plane is aligned with the X and Z axes, and if a Z coordinate is identified, then the plane is aligned with the X and Y axes. Planes at diagonals to the coordinate axes would increase the level of computation required to identify the position of a plane.

In the present example, it is clear that no plane can be identified which defines more than 40% empty space on one side thereof. Therefore, the procedure moves on to step S14, where an enquiry is made as to whether there are less than 256 vertices in the sector as a whole. In the sector 100 as a whole, the cube 102 has 8 vertices, the sphere 104 has about 800 vertices, the cone 106 has about 300 vertices and the cylinder 108 has about 200 vertices. Therefore, the sector contains in the region of 1300 vertices. Accordingly, the result of that enquiry in step S14 is negative. Following a negative result of that enquiry, the procedure carries on with step S16. Step S16 inquires as to whether an axis aligned plane can be placed to extend between the geometry of the sector, i.e. with no intersections. In the present example, such a plane can be found, and has been placed in FIG. 4 and marked with reference numeral 120. It is important to place the plane adjacent at least some of the geometry of the sector under consideration, in order to allow for the possibility of one or other of the sub-sectors created thereby producing a positive result of step S12 when the procedure is then applied to that sub-sector.

While achieving a positive result of the enquiry in step S16, the procedure follows to step S22. In this step, the sector under consideration (bounding box 100) is divided along the identified dividing plane 120. The dividing plane 120 is placed in a binary space partitioning tree, along with the two daughter sectors 150, 152 defined thereby. The procedure then follows with a further step S26, in which an enquiry is made as to whether any more sectors remain to be considered. In this case, that is obviously correct, since the procedure has just created two new daughter sectors 150, 152. Therefore, the procedure passes to step S28, and the next sector (daughter sector 152) is then selected. The procedure then returns to step S12.

Figure 5:
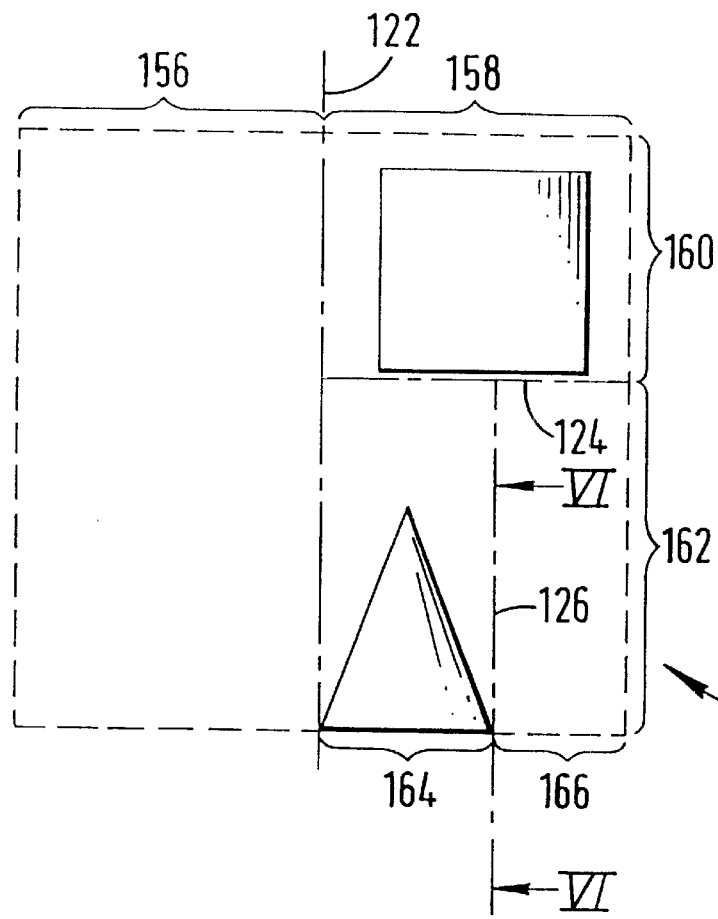
FIG. 5 is an elevation in the direction of arrows V—V of a sector of the scene illustrated in FIG. 4.

FIG. 5 illustrates daughter sector 152 in the direction of arrows V—V in FIG. 4. The sector 152 is considered in step S12, and a large volume to the left of FIG. 5 is identified as containing no objects. In particular, the test in S12 identifies whether at least 30% of the volume of the sector can be identified as containing no objects. In the present case, nearer 50% of the volume of sector 152 can be identified as such.

Then, having obtained a positive result to the enquiry of step S12, the procedure routes straight to step S22, and the sector 152 is divided along the identified dividing plane 122 into two daughter sectors 156, 158. Dividing plane 122 and daughter sectors 156, 158 are placed in the BSP tree in the place of the entry for sector 152.

Then, a check is made as to whether any more sectors remain to be considered in S26. Daughter sector 156 does not remain to be considered because it contains no objects. The next sector to be selected in step S28 therefore is sector 158. This sector fails the test set up in step S12 and the test set up in step S14. In step S16, an axis aligned plane 124 is identified which extends between the geometry of the sector, and adjacent the cube 102. This divides sector 158 into daughter sectors 160 and 162. The dividing plane 124 and the daughter sectors 160 and 162 are placed in the BSP tree in replacement of sector 158.

Daughter sector 160 is then considered and fails step S12. However, it then passes the test of step S14, since it contains only 8 vertices. Consideration then passes to sector 162, which passes the test of step S12, and a dividing plane 126 is identified which defines roughly 50% of the space thereof as being empty. The sector 162 is divided along the dividing plane 126 into two daughter sectors 164, 166.

Figure 6:
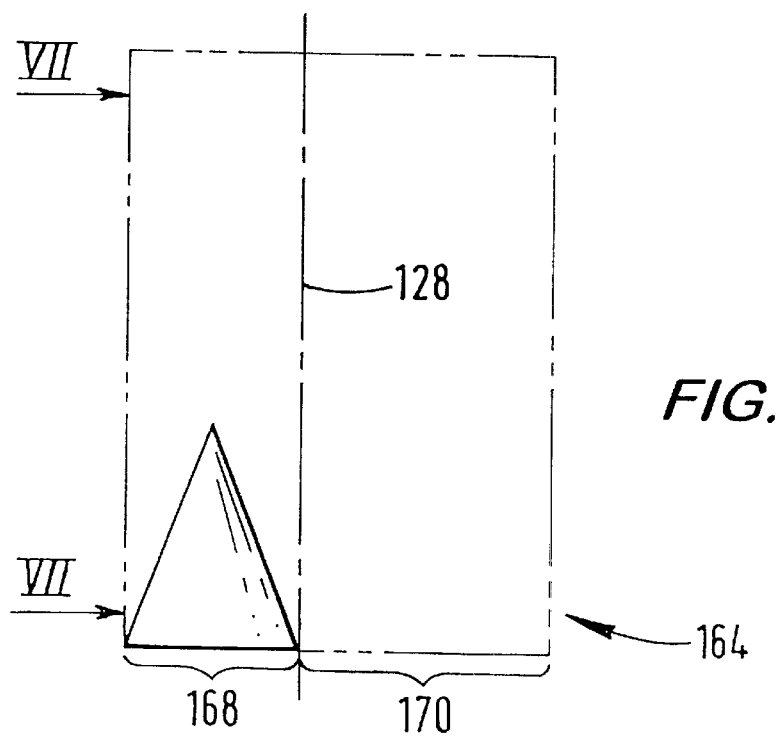
FIG. 6 is an elevation in the direction of arrows VI—VI of a sector of the scene illustrated in FIG. 5.

FIG. 6 illustrates daughter sector 164 in more detail in the direction of the arrows VI—VI marked in FIG. 5. Sector 164 is considered in step S12 and dividing plane 128 is identified which defines about 60% empty space within that sector. The sector is divided along that dividing plane 128 into two daughter sectors 168 and 170, and the dividing plane and the daughter sectors are fed into the BSP tree as previously described.

Figure 7:
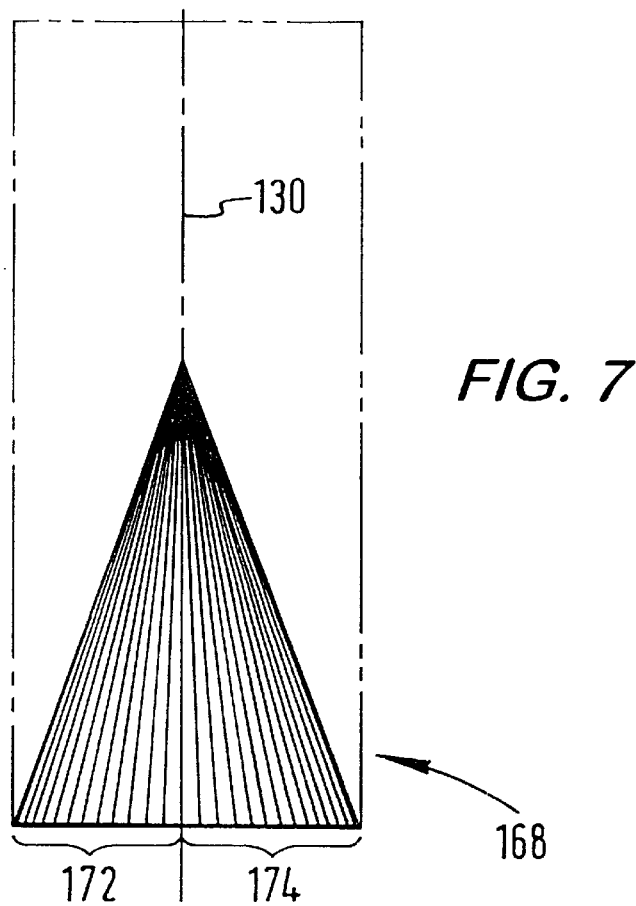
FIG. 7 is an elevation in the direction of arrows VII—VII of a sector of the scene illustrated in FIG. 6.

Daughter sector 168 is then considered. That sector is best illustrated in FIG. 7 which constitutes a view in the direction of arrows VII—VII as indicated in FIG. 6. In FIG. 7, the cone 106 is illustrated in close detail, with particular attention to the plurality of triangles which together define the surface of the cone 106. For reasons of clarity, rather less triangles than are actually used to defined the cone are illustrated. With reference to sector 168, no axis aligned plane can be identified which defines more than 40% empty space therein. Therefore, step S12 returns a negative result. Step S14 is then considered, and, as identified previously, the number of vertices in the sector exceeds 256, since the cone 106 is defined by 300 vertices.

Therefore, consideration passes to step S16. In this step, axis aligned planes are considered which might extend between the geometry of the sector. However, only one body is contained within the sector, and so this step must also fail. Therefore, the procedure then proceeds to step S18. In this step, an enquiry is made as to whether an axis aligned plane can be placed in the sector so as to cause a minimum number of polygons to be divided. This minimum number is to be predetermined and placed in memory in the computer 2.

In the present case, an axis aligned plane 130 can be defined so as to cause division of only a few polygons as illustrated in FIG. 7, thereby returning a positive result at step S18. A positive result to step S18, as illustrated in FIG. 7, results in the procedure progressing to step S22 as before, dividing the sector along the identified dividing plane 130 and placing the dividing plane 130 and the resultant to daughter sectors 172, 174 in the binary space partition tree. The next sector to be considered is original daughter sector 150. In step S12, no empty space can be found which can be defined by an axis aligned plane to more than 40% volume of the total sector 150. Therefore, the procedure progresses to step S14. Step S14 ascertains that there are about 1000 vertices in this sector, which is clearly greater than 256.

Figure 8:
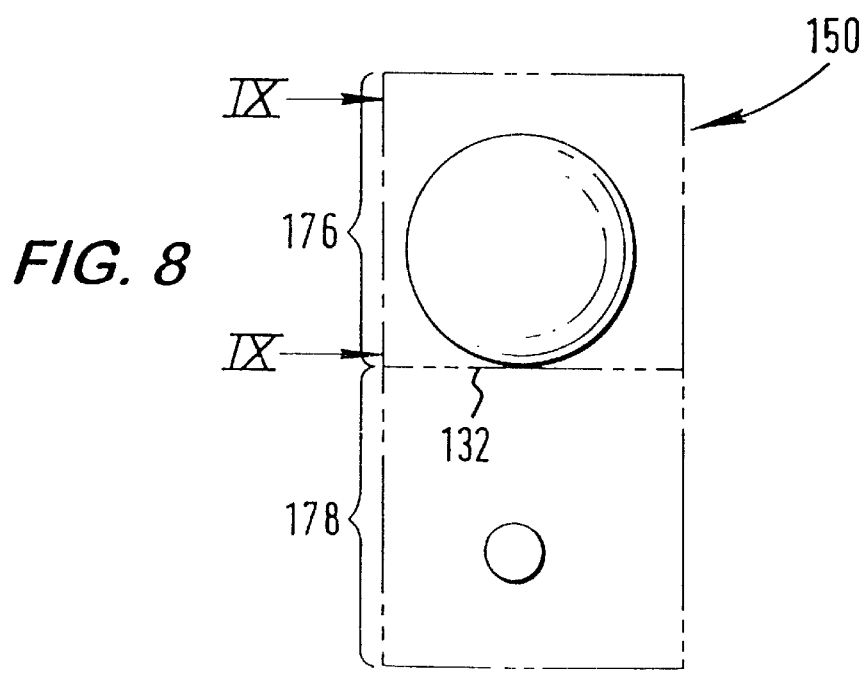
FIG. 8 is an elevation in the direction of arrows IV—IV of a further sector of the scene illustrated in FIGS. 3 and 4.

Therefore, the procedure progresses to step S16. In step S16, an axis aligned plane 132 is identified which extends between the geometry of the sector 150. This plane is illustrated best in FIG. 8. This plane divides the sector in step S22 into two daughter sectors 176, 178. These two sectors remain to be considered further.

Figure 9:
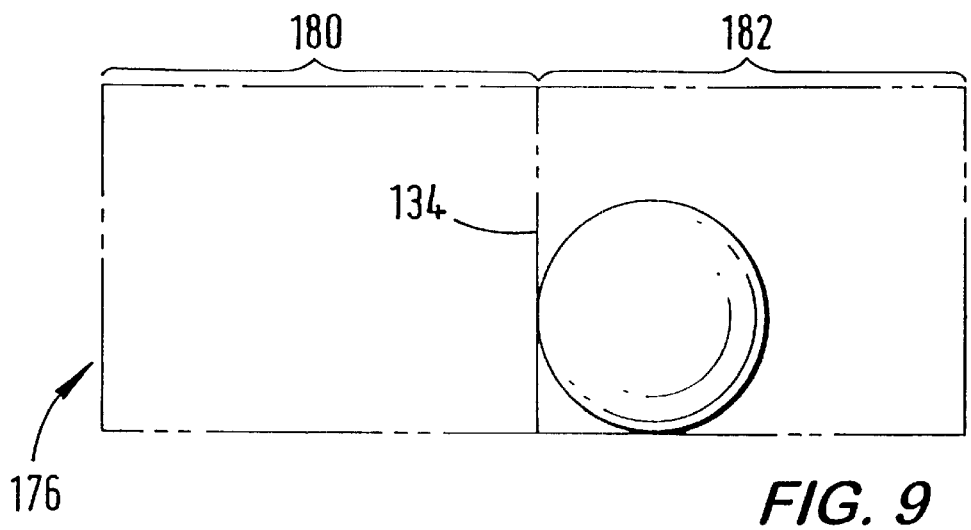
FIG. 9 is an elevation in the direction of arrows IX—IX of a sector of the sector illustrated in FIG. 8.
Figure 10:
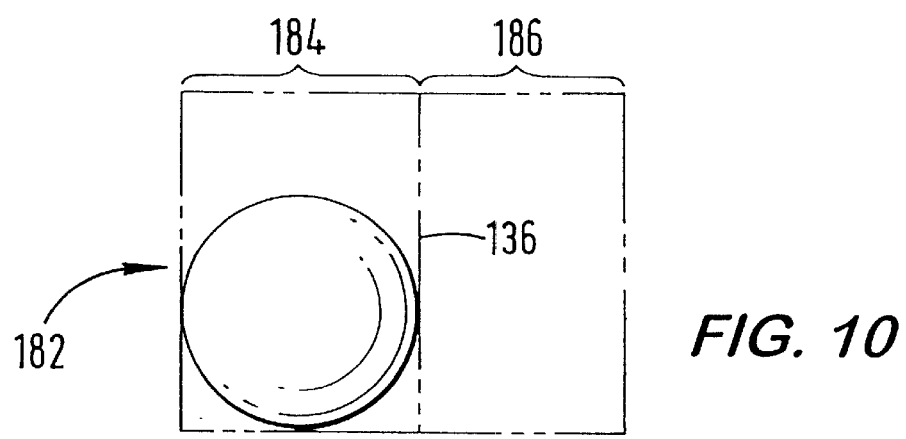
FIG. 10 is an elevation in the direction of arrows IX—IX of a sector of the sector illustrated in FIG. 9.

Firstly, daughter sector 176 contains the sphere 104. This sector is illustrated in front view (i.e. from the left of FIG. 8) in FIG. 9. An axis aligned plane 134 is identified which defines more than 40% empty space in the sector, and this is used to divide the sector into daughter sectors 180, 182. Daughter sector 180 is empty and so is processed no further. Daughter sector 182 is illustrated in the same elevation in FIG. 10. Again, a dividing plane 136 is identified which divides off an empty daughter sector 186 from a daughter sector 184 containing the sphere.

Figure 11:
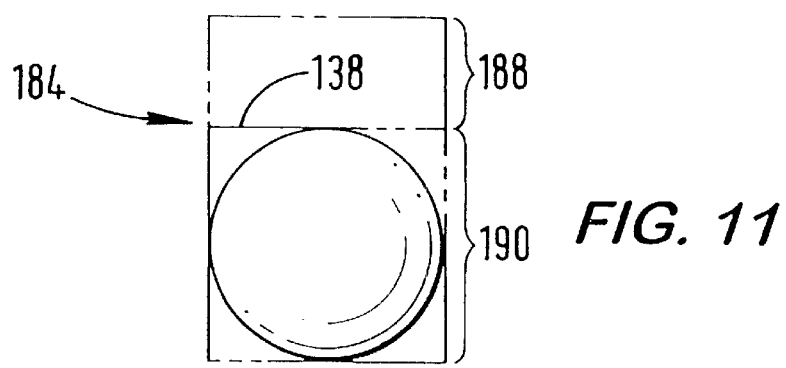
FIG. 11 is an elevation in the direction of arrows IX—IX of a sector of the sector illustrated in FIG. 10.
Figure 12:
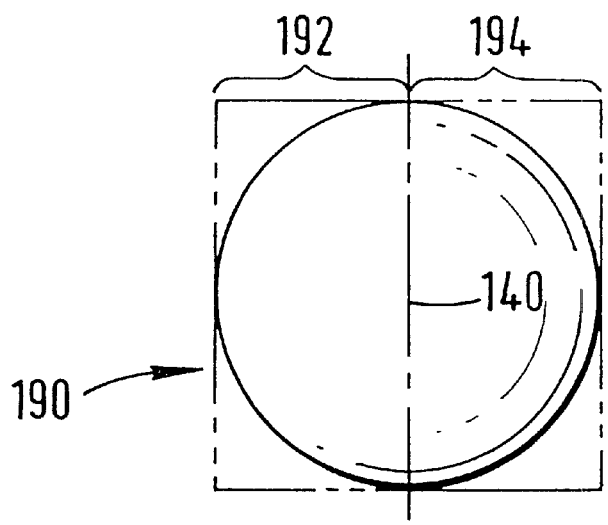
FIG. 12 is an elevation in the direction of arrows IX—IX of a sector of the sector illustrated in FIG. 11.

The daughter sector 184 is illustrated further in FIG. 11. Again, a dividing plane 138 is defined which divides off about 40% empty space into a daughter sector 188 with the sphere contained by daughter sector 190. Daughter sector 190 is considered further in FIG. 12. This sector fails the test of step S14 since the sector contains about 800 vertices. In step S16, no axis aligned plane can extend between the geometry of the sector since it only contains one object. In step S18, no axis aligned plane can be identified so as to cause a minimum of polygons to be divided. This is because of the complexity of the network of triangles used to define a sphere, which results in any intersecting plane causing too many triangles to be intersected. Accordingly, the procedure must now progress to step S20, where an axis aligned plane 140 is placed in the sector 190 so as to bisect the longest dimension of the sector. The result of this is the creation of two daughter sectors 192, 194 which are illustrated in FIGS. 13 and 14 respectively.

Figure 13:
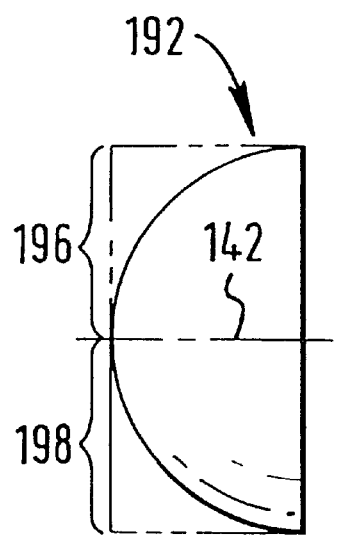
FIG. 13 is an elevation in the direction of arrows IX—IX of a sector of the sector illustrated in FIG. 12.
Figure 14:
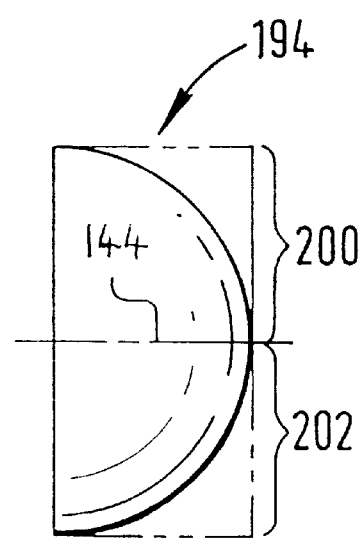
FIG. 14 is an elevation in the direction of arrows IX—IX of a sector of the sector illustrated in FIG. 12.

In FIG. 13, sector 192 is considered, and it is found that this sector still contains about 400 vertices.

Again, no axis aligned plane can be found which either extends between the geometry of the sector or can be placed so as to cause the number of polygons to be divided to be below a maximum permitted value. Therefore, step S20 is again applied to the sector, placing a dividing plane 142 so as to bisect the longest dimension of the sector. This creates daughter sectors 196 and 198 which each contain less than 256 vertices (about 200), which can be placed on the binary space partition tree.

Figure 15:
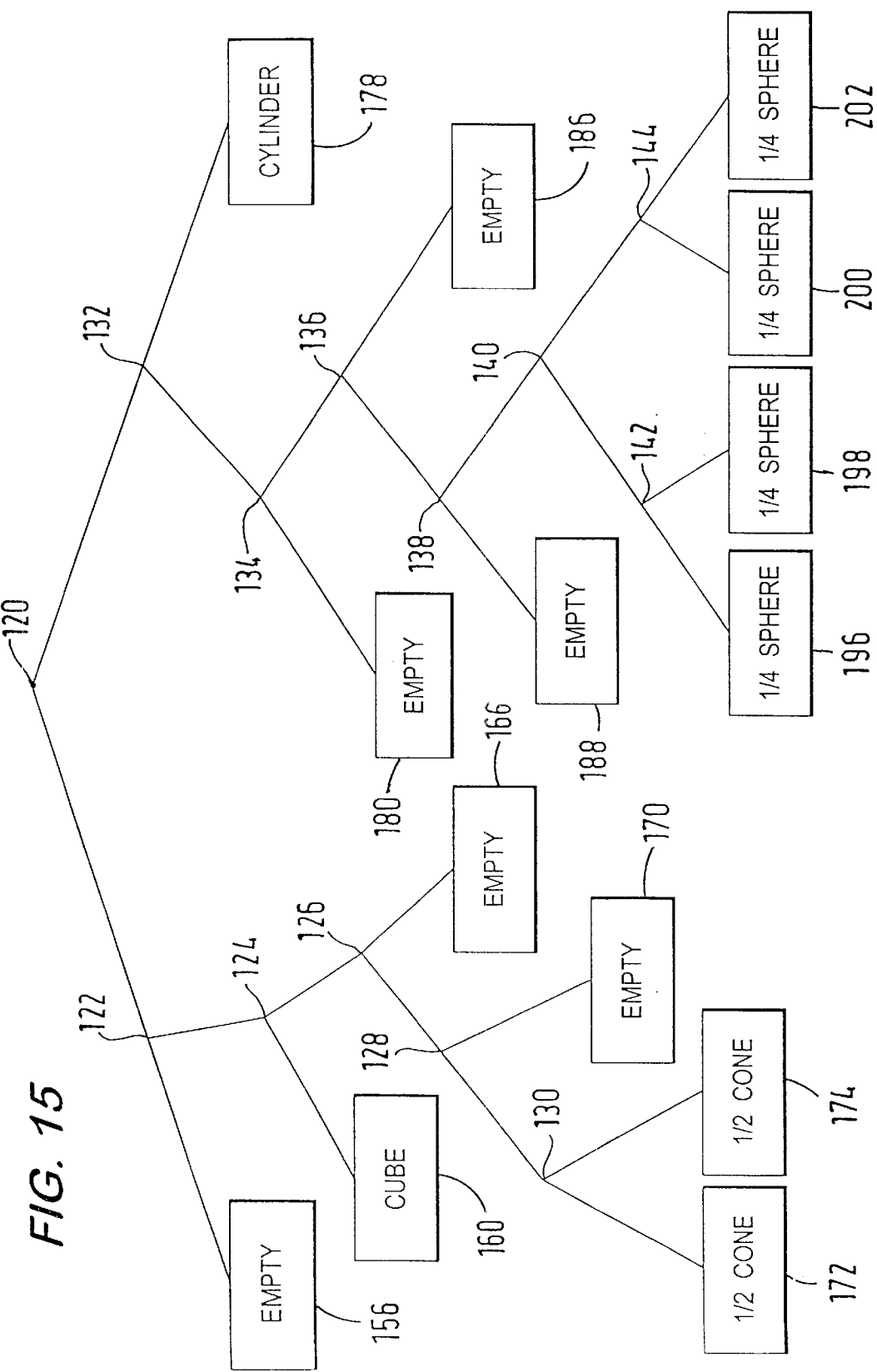
FIG. 15 is a schematic diagram showing a Binary Space Partition tree arranged in accordance with the sectors illustrated in FIGS. 3 to 14.

After application of the described procedure to all sectors within the environment to be represented graphically, a binary space partition tree as illustrated in FIG. 15 is formed. This data structure can be traversed with a minimum of steps so as to identify sectors which can be processed easily.

Once the binary space partition tree as illustrated in FIG. 15 has been formed by the sub-divider 44, the aforesaid data structure is passed to the compressor 46. The compressor 46 is operable to take account of certain advantages incorporated in the data structure created by the sub-divider 44.

Firstly, the sub-divider 44 has been designed such that any sector created thereby has a maximum of 256 vertices contained therein. Accordingly, each vertex can be indexed by a variable of type CHAR. In other words, each triangle within the sector can be identified by three CHARs.

Secondly, since we know that there is a limit to the number of polygons within each sector, the materials for those polygons can also be indexed by a variable of type CHAR.

By aligning cutting planes with axes in three dimensions, the distances of points within a space from cutting planes can be calculated easily. Moreover, by providing a structure decision making process, the process of binary space partitioning can be made substantially quicker.

The structure of the sectors is such that sector visibility can be assessed easily. If it is known that a sector is entirely occluded by an object in another sector, then that sector is deemed to be invisible to the viewer and can be disregarded from further rendering. Moreover, if a sector has been identified that has only empty sectors before it, then it can be seen that the sector will be entirely visible. In that case, the sectors before the sector in question can be disregarded from rendering and the sector in question can be rendered directly into the frame buffer.

The preprocessor 40 described above can be implemented as an exporter for converting data generated by a graphical design package into a BSP tree structure. The output from the exporter is then in a form which can be packaged with a content software program, including a rendering pipeline. The output BSP tree can be rendered easily and efficiently by the rendering pipeline because the rendering pipeline can discard all non-visible or empty branches of the tree.

What is claimed is:

1. A computer graphics apparatus comprising:
   a data store configured to store data defining a three-dimensional computer model of a plurality of objects in a three-dimensional space; and
   a preprocessor operable to partition the three-dimensional space into a plurality of sectors by recursively sub-dividing the three-dimensional space into sectors such that, on each recursion, two sectors are generated using a partition plane positioned with regard to the content of the three-dimensional computer model, the preprocessor being operable to:
   identify volumes of the three-dimensional space which do not contain any of the objects;
   determine whether a partition plane having one of a plurality of predetermined directions can be positioned to divide the three-dimensional space to separate an identified volume containing no objects from the rest of the three-dimensional space, wherein each predetermined direction in the plurality of directions available for the partition plane is a direction independent of any object in the three-dimensional computer model; and
   if it is determined that a partition plane can be so positioned, to position the partition plane so as to create two new sectors in the three-dimensional space, one of the sectors comprising the volume containing no objects, and to add the sectors to a binary space partition tree together with data identifying the objects in each sector.

2. Apparatus in accordance with claim 1, wherein the plurality of predetermined directions available for each partition plane comprise three mutually perpendicular directions.

3. Apparatus in accordance with claim 2, wherein the three mutually perpendicular directions comprise directions parallel to the three axes of the three-dimensional space.

4. Apparatus in accordance with claim 1, wherein the preprocessor is operable, in the event that it is determined that a partition plane having one of the predetermined directions can be positioned to separate a volume containing no objects from the rest of the three-dimensional space, to position the partition plane to maximize the volume of the resulting sector which contains no objects.

5. Apparatus in accordance with claim 1, wherein the preprocessor is operable to determine whether a partition plane having one of the plurality of predetermined directions can be positioned to divide an existing sector of the three-dimensional space to define two new sectors in the three-dimensional space such that the resulting new sector containing no objects is greater than a predetermined proportion of the existing sector.

6. A computer graphics apparatus comprising:
   means for storing data defining a three-dimensional computer model of a plurality of objects in a three-dimensional space; and means for partitioning the three-dimensional space into a plurality of sectors by recursively sub-dividing the three-dimensional space into sectors such that, on each recursion, two sectors are generated using a partition plane positioned with regard to the content of the three-dimensional computer model, the means for partitioning the three-dimensional space being operable to:
  identify volumes of the three-dimensional space which do not contain any of the objects;
  determine whether a partition plane having one of a plurality of predetermined directions can be positioned to divide the three-dimensional space to separate an identified volume containing no objects from the rest of the three-dimensional space, wherein each predetermined direction in the plurality of directions available for the partition plane is a direction independent of any object in the three-dimensional computer model; and
  if it is determined that a partition plane can be so positioned, position the partition plane so as to create two new sectors in the three-dimensional space, one of the sectors comprising the volume containing no objects, and add the sectors to a binary space partition tree together with data identifying the objects in each sector.

7. A computer graphics apparatus comprising:
  a data store configured to store data defining a three-dimensional computer model of a plurality of objects in a three-dimensional space, each object comprising a plurality of polygons and each polygon having a plurality of vertices; and
  a preprocessor operable to partition the three-dimensional space into a plurality of sectors by recursively sub-dividing the three-dimensional space into sectors such that, on each recursion, two sectors are generated using a partition plane positioned with regard to the content of the three-dimensional computer model, the preprocessor being operable to:
    identify a sector of the three-dimensional space which contains more than a predetermined number of polygon vertices as an identified sector;
    position a partition plane in the three-dimensional space having a direction selected from a plurality of predetermined directions so as to create two new sectors from the identified sector, each new sector containing some of the polygon vertices from the identified sector, and to add the new sectors to a binary space partition tree together with data identifying the vertices in each sector, wherein each predetermined direction in the plurality of directions available for the partition plane is a direction independent of any object in the three-dimensional computer model; and
    repeat the processing to identify a sector containing more than the predetermined number of polygon vertices as an identified sector and to partition the identified sector to create two new sectors therefrom, until each sector in the three-dimensional space contains no more than the predetermined number of polygon vertices.

8. Apparatus in accordance with claim 7, wherein the plurality of predetermined directions available for each partition plane comprise three mutually perpendicular directions.

9. Apparatus in accordance with claim 8, wherein the three mutually perpendicular directions comprise directions parallel to the three axes of the three-dimensional space.

10. Apparatus in accordance with claim 7, wherein the preprocessor is operable to determine whether a partition plane having one of the plurality of predetermined directions can be positioned in the three-dimensional space between objects in the identified sector without splitting any of the polygons in the objects, and, in the event that it is determined that such a partition plane can be so positioned, to position the partition plane so as to create two new sectors from the identified sector without splitting any polygons therein, each new sector containing at least one object from the identified sector.

11. Apparatus in accordance with claim 10, wherein the preprocessor is operable in the event that it is determined that a partition plane having one of the predetermined directions cannot be positioned in the three-dimensional space between objects in the identified sector without splitting any of the polygons in the objects, to determine whether a partition plane having one of the predetermined directions can be positioned in the three-dimensional space so as to split fewer than a predetermined number of polygons in the identified sector, and, in the event that it is determined that such a partition plane can be so positioned, to position the partition plane to split fewer than the predetermined number of polygons in the identified sector so as to create two new sectors from the identified sector, each new sector containing polygons from the identified sector.

12. Apparatus in accordance with claim 7, wherein the predetermined number of polygon vertices is 256.

13. Apparatus in accordance with claim 12, wherein the data store is configured to store data defining a three-dimensional computer model wherein each polygon therein is identified by a plurality of variables of the type "CHAR".

14. A computer graphics apparatus comprising:
  means for storing data defining a three-dimensional computer model of a plurality of objects in a three-dimensional space, each object comprising a plurality of polygons and each polygon having a plurality of vertices; and
  means for partitioning the three-dimensional space into a plurality of sectors by recursively sub-dividing the three-dimensional space into sectors such that, on each recursion, two sectors are generated using a partition plane positioned with regard to the content of the three-dimensional computer model, the means for partitioning the three-dimensional space being operable to:
    identify a sector of the three-dimensional space which contains more than a predetermined number of polygon vertices as an identified sector;
    position a partition plane in the three-dimensional space having a direction selected from a plurality of predetermined directions so as to create two new sectors from the identified sector, each new sector containing some of the polygon vertices from the identified sector, and to add the new sectors to a binary space partition tree together with data identifying the vertices in each sector, wherein each predetermined direction in the plurality of directions available for the partition plane is a direction independent of any object in the three-dimensional computer model; and
    repeat the processing to identify a sector containing more than the predetermined number of polygon vertices as an identified sector and to partition the identified sector to create two new sectors therefrom, until each sector in the three-dimensional space contains no more than the predetermined number of polygon vertices.

15. A method, performed in a computer graphics apparatus, of processing data defining a three-dimensional computer model of a plurality of objects in a three-dimensional space to partition the three-dimensional space into a plurality of sectors by recursively sub-dividing the three-dimensional space into sectors such that, on each recursion, two sectors are generated using a partition plane positioned with regard to the content of the three-dimensional computer model, the method comprising:

identifying volumes of the three-dimensional space which do not contain any of the objects;

determining whether a partition plane having one of a plurality of predetermined directions can be positioned to divide the three-dimensional space to separate an identified volume containing no objects from the rest of the three-dimensional space, wherein each predetermined direction in the plurality of directions available for the partition plane is a direction independent of any object in the three-dimensional computer model; and if it is determined that a partition plane can be so positioned, positioning the partition plane so as to create two new sectors in the three-dimensional space, one of the sectors comprising the volume containing no objects, and adding the sectors to a binary space partition tree together with data identifying the objects in each sector.

16. A method in accordance with claim 15, wherein the plurality of predetermined directions available for each partition plane comprise three mutually perpendicular directions.

17. A method in accordance with claim 16, wherein the three mutually perpendicular directions comprise directions parallel to the three axes of the three-dimensional space.

18. A method in accordance with claim 15, wherein, in the event that it is determined that a partition plane having one of the predetermined directions can be positioned to separate a volume containing no objects from the rest of the three-dimensional space, the partition plane is positioned to maximise the volume of the resulting sector which contains no objects.

19. A method in accordance with claim 15, wherein the processing to determine whether a partition plane having one of a plurality of predetermined directions can be positioned to divide the three-dimensional space to separate an identified volume containing no objects from the rest of the three-dimensional space comprises processing to determine whether a partition plane having one of the plurality of predetermined directions can be positioned to divide an existing sector of the three-dimensional space to define two new sectors in the three-dimensional space such that the resulting new sector containing no objects is greater than a predetermined proportion of the existing sector.

20. A method, performed in a computer graphics apparatus, of processing data defining a three-dimensional computer model of a plurality of objects in a three-dimensional space, each object comprising a plurality of polygons and each polygon having a plurality of vertices, to partition the three-dimensional space into a plurality of sectors by recursively sub-dividing the three-dimensional space into sectors such that, on each recursion, two sectors are generated using a partition plane positioned with regard to the content of the three-dimensional computer model, the method comprising:

identifying a sector of the three-dimensional space which contains more than a predetermined number of polygon vertices as an identified sector;

positioning a partition plane in the three-dimensional space having a direction selected from a plurality of predetermined directions so as to create two new sectors from the identified sector, each new sector containing some of the polygon vertices from the identified sector, and adding the new sectors to a binary space partition tree together with data identifying the vertices in each sector, wherein each predetermined direction in the plurality of directions available for the partition plane is a direction independent of any object in the three-dimensional computer model; and repeating the processing to identify a sector containing more than the predetermined number of polygon vertices as an identified sector and to partition the identified sector to create two new sectors therefrom, until each sector in the three-dimensional space contains no more than the predetermined number of polygon vertices.

21. A method in accordance with claim 20, wherein the plurality of predetermined directions available for each partition plane comprise three mutually perpendicular directions.

22. A method in accordance with claim 21, wherein the three mutually perpendicular directions comprise directions parallel to the three axes of the three-dimensional space.

23. A method in accordance with claim 20, wherein processing is performed to determine whether a partition plane having one of the plurality of predetermined directions can be positioned in the three-dimensional space between objects in the identified sector without splitting any of the polygons in the objects, and, in the event that it is determined that such a partition plane can be so positioned, the partition plane is positioned so as to create two new sectors from the identified sector without splitting any polygons therein, each new sector containing at least one object from the identified sector.

24. A method in accordance with claim 23, wherein, in the event that it is determined that a partition plane having one of the predetermined directions cannot be positioned in the three-dimensional space between objects in the identified sector without splitting any of the polygons in the objects, processing is performed to determine whether a partition plane having one of the predetermined directions can be positioned in the three-dimensional space so as to split fewer than a predetermined number of polygons in the identified sector, and, in the event that it is determined that such a partition plane can be so positioned, the partition plane is positioned to split fewer than the predetermined number of polygons in the identified sector so as to create two new sectors from the identified sector, each new sector containing polygons from the identified sector.

25. A method in accordance with claim 20, wherein the predetermined number of polygon vertices is 256.

26. A method in accordance with claim 25, wherein the data defining the three-dimensional computer model comprises data identifying each polygon therein by a plurality of variables of the type "CHAR".

27. A method according to claim 15 or claim 20, further comprising processing the data defining the three-dimensional computer model using the generated binary space partition tree to generate image data defining an image of the three-dimensional computer model.

28. A method according to claim 15 or claim 20, further comprising generating a signal, either directly or indirectly, conveying the generated binary space partition tree.

29. A method according to claim 15 or claim 20, further comprising making a recording of the generated binary space partition tree either directly or indirectly.

30. A storage medium storing instructions for programming a programmable processing apparatus to become configured as an apparatus in accordance with claim 1 or claim 7.

31. A storage medium storing instructions for programming a programmable processing apparatus to become operable to perform a method as set out in claim 15 or claim 20.

32. A signal carrying instructions for programming a programmable processing apparatus to become configured as an apparatus in accordance with claim 1 or claim 7.

33. A signal carrying instructions for programming a programmable processing apparatus to become operable to perform a method as set out in claim 15 or claim 20.

* * * * *